United States Patent
Konishi (10) Patent No.: US 12,094,227 B2
(45) Date of Patent: Sep. 17, 2024

(54) OBJECT RECOGNITION DEVICE AND OBJECT RECOGNITION METHOD

(71) Applicant: OMRON Corporation, Kyoto (JP)

(72) Inventor: Yoshinori Konishi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 451 days.

(21) Appl. No.: 17/614,642

(22) PCT Filed: Jun. 12, 2019

(86) PCT No.: PCT/JP2019/023330
§ 371 (c)(1),
(2) Date: Nov. 29, 2021

(87) PCT Pub. No.: WO2020/250348
PCT Pub. Date: Dec. 17, 2020

(65) Prior Publication Data
US 2022/0230459 A1    Jul. 21, 2022

(51) Int. Cl.
*G06V 20/64* (2022.01)
*G06T 11/00* (2006.01)

(52) U.S. Cl.
CPC ............ *G06V 20/647* (2022.01); *G06T 11/00* (2013.01)

(58) Field of Classification Search
CPC ......... G06T 7/593; G06T 7/97; G06T 3/4015; G06V 10/10; G06V 10/147; G06V 10/95
See application file for complete search history.

(56) References Cited

U.S. PATENT DOCUMENTS

| | | | | |
|---|---|---|---|---|
| 4,823,533 A | * | 4/1989 | Hillstrom | E04F 13/0803 52/510 |
| 5,904,653 A | * | 5/1999 | Hatfield | G01S 7/5206 128/916 |
| 6,891,966 B2 | * | 5/2005 | Chen | G06T 7/12 382/173 |
| 7,003,134 B1 | * | 2/2006 | Covell | G06T 7/251 382/106 |
| 7,102,637 B2 | * | 9/2006 | Chen | H04N 13/133 345/589 |

(Continued)

FOREIGN PATENT DOCUMENTS

| | | |
|---|---|---|
| CN | 103065130 A | 4/2013 |
| JP | 2008203991 A | 9/2008 |
| JP | 2019003407 A | 1/2019 |

OTHER PUBLICATIONS

Extended European Search Report issued in European Appln. No. 19932513.5 mailed Nov. 9, 2022.

(Continued)

*Primary Examiner* — Yosef Kassa
(74) *Attorney, Agent, or Firm* — ROSSI, KIMMS & McDOWELL LLP (57) ABSTRACT

An object recognition apparatus includes a three-dimensional data obtainer that obtains three-dimensional data including a plurality of points each having three-dimensional information, a parallel projection converter that generates a two-dimensional image by parallel projection of the plurality of points included in the three-dimensional data onto a projection plane, and a recognition processor that detects a target object in the two-dimensional image using template matching.

10 Claims, 9 Drawing Sheets

(56) References Cited

U.S. PATENT DOCUMENTS

| | | | | |
|---|---|---|---|---|
| 7,353,994 B2* | 4/2008 | Farrall | ................... | G07D 7/128 |
| | | | | 235/494 |
| 7,436,988 B2* | 10/2008 | Zhang | ................. | G06V 40/168 |
| | | | | 382/118 |
| 7,873,185 B2* | 1/2011 | Cremers | ................. | G06T 7/251 |
| | | | | 382/209 |
| 8,482,650 B2* | 7/2013 | Shimma | ................ | G06F 3/0482 |
| | | | | 345/687 |
| 8,737,720 B2* | 5/2014 | Mas | ........................ | G06T 7/593 |
| | | | | 382/106 |
| 9,203,301 B2* | 12/2015 | Tang | ..................... | H02M 3/156 |
| 9,239,235 B2* | 1/2016 | Miyagawa | ......... | G01B 11/2522 |
| 9,341,678 B2* | 5/2016 | Kim | .................... | G01R 31/382 |
| 9,424,470 B1 | 8/2016 | Hinterstoisser | | |
| 9,659,217 B2 | 5/2017 | Hinterstoisser | | |
| 9,754,371 B2* | 9/2017 | Kateb | ................. | A61B 5/0042 |
| 2015/0288947 A1 | 10/2015 | Ahrns et al. | | |
| 2016/0335496 A1 | 11/2016 | Hinterstoisser | | |
| 2018/0365516 A1 | 12/2018 | Konishi | | |

OTHER PUBLICATIONS

Saputra "Casualty Detection from 3D Point Cloud Data for Autonomous Ground Mobile Rescue Robots" 2018 IEEE International Symposium On Safety, Security, And Rescue Robotics (SSRR), Aug. 2018, pp. 1-7.

Jorgensen "Shape Recognition System for Automatic Disassembly of TV-sets" Proceedings Of The International Conference On Image Processing (ICIP), IEEE, Sep. 1996, pp. 653-656.

International Search Report issued in Intl. Appln. No. PCT/JP2019/023330 mailed Sep. 3, 2019. English translation provided.

Written Opinion issued in Intl. Appln. No. PCT/JP2019/023330 mailed Sep. 3, 2019. English translation provided.

* cited by examiner

OBJECT RECOGNITION DEVICE AND OBJECT RECOGNITION METHOD

FIELD

The present invention relates to a technique for recognizing a three-dimensional (3D) object using template matching.

BACKGROUND

Template matching is a method for recognizing (detecting) an object in an image. In template matching, a model (template) for an object to be recognized is prepared, and the degree of image feature matching is evaluated between an input image and the model to detect the object included in the input image. Object detection by template matching is used in, for example, inspection and picking in factory automation (FA), robot vision, and monitoring cameras.

Recent template matching is used to recognize the 3D position and the 3D orientation of an object. In basic template matching, multiple templates with different views of a target object viewed from different points are prepared, and the template that most closely matches the view of the target object in an input image is selected from the templates to determine the 3D position and the 3D orientation of the target object relative to the camera. The resolution of recognition with this method is proportional to the variations of templates. A higher resolution of recognition involves a heavier load for generating templates, a larger amount of data for templates, and a longer processing time for template matching.

In response to the above issue, Patent Literature 1 describes a technique for measuring the depth of a target object with a depth sensor and scaling up or down a template (two-dimensional or 2D grid for sampling feature values) in accordance with the depth.

CITATION LIST

Patent Literature

Patent Literature 1: U.S. Pat. No. 9,659,217

SUMMARY

Technical Problem

The method described in Patent Literature 1 uses a common template for views different from one another in depth alone, and may thus involve a lighter load for generating templates and may use fewer templates. However, a search for template matching involves scaling up or down a template in accordance with the depth of each pixel, causing slow processing speed. To reduce the time taken to scale up or down a template, templates with different scales may be generated in accordance with the range in which the target object can be located and the resolution to be expected, and the templates may be stored in a work memory. However, this is technically possible but uses large memory capacity and may be impractical.

In response to the above issue, one or more aspects of the present invention are directed to a practical technique for faster detection of objects at various depths using template matching.

Solution to Problem

An object recognition apparatus according to one aspect of the present invention includes a three-dimensional data obtainer that obtains three-dimensional data including a plurality of points each having three-dimensional information, a parallel projection converter that generates a two-dimensional image by parallel projection of the plurality of points included in the three-dimensional data onto a projection plane, and a recognition processor that detects a target object in the two-dimensional image using template matching.

Three-dimensional data may be obtained by 3D measurement. Any 3D measurement system may be used, including active systems and passive systems. Template matching is used to evaluate the degree of image feature matching (similarity) between a template (model) for a target object and a target region in a 2D image to determine whether a partial image in the target region is an image of the target object. Multiple templates with different views of a target object may be used for template matching to also recognize the orientation of the target object.

In one or more aspects of the present invention, 3D data undergoes parallel projection to generate a 2D image for template matching. In parallel projection, target objects at any distance from the projection plane are projected to have the same size. All the 2D images of target objects (at any depth) generated by parallel projection have the same size. Thus, a template for a single size alone may be used for matching, allowing faster processing than known methods (scaling a template in accordance with the depth). This method also uses fewer templates, less data, and less work memory, and is thus practical.

The recognition processor may use, as a template for the target object, a template generated from an image resulting from parallel projection of the target object. Generating the template from the parallel projection image allows more accurate matching between the template and the target object image in the 2D image, thus allowing a more reliable object recognition process.

The projection plane may be set in any manner. The projection plane may be set to allow the points in 3D data to distribute on the projection plane as widely as possible when projected onto the projection plane. For example, the three-dimensional data is generated using an image captured with a camera. In this case, the parallel projection converter may set the projection plane to be orthogonal to an optical axis of the camera.

In response to a first point included in the three-dimensional data being projected onto a first pixel in the two-dimensional image, the parallel projection converter may associate depth information determined from the three-dimensional information about the first point with the first pixel. The plurality of points included in the three-dimensional data each may have luminance information. In this case, in response to a first point included in the three-dimensional data being projected onto a first pixel in the two-dimensional image, the parallel projection converter may associate the luminance information about the first point with the first pixel. The plurality of points included in the three-dimensional data each may have color information. In this case, in response to a first point included in the three-dimensional data being projected onto a first pixel in the two-dimensional image, the parallel projection converter may associate the color information about the first point with the first pixel.

In response to no point being projected onto a second pixel in the two-dimensional image, the parallel projection converter may generate, based on information associated with a pixel adjacent to the second pixel, information to be associated with the second pixel. For example, the parallel projection converter may determine the information to be associated with the second pixel by interpolating information associated with the pixel adjacent to the second pixel. This process increases the amount of information about the 2D image and may thus allow more accurate template matching.

The three-dimensional data may be generated using an image captured with a camera. In response to two or more points of the plurality of points included in the three-dimensional data being projected onto the same position on the projection plane, the parallel projection converter may use one of the two or more points closest to the camera to generate the two-dimensional image. This process generates a parallel projection image reflecting any overlap between objects (one object hidden behind another) as viewed from the projection plane (or in other words, the points viewable from the camera alone are mapped into a 2D image), thus allowing an accurate object recognition process using template matching.

One or more aspects of the present invention may be directed to an object recognition apparatus including at least part of the above means or structures, or may be directed to an image processor for performing the above parallel projection conversion. One or more aspects of the present invention may be directed to an object recognition method, an image processing method, a template matching method, or a control method for an object recognition apparatus including at least part of the above processes, or may be directed to a program for implementing any of these methods or a non-transitory storage medium storing the program. The above means and processes may be combined with one another in any possible manner to form one or more aspects of the present invention.

Advantageous Effects

The above aspects of the present invention provide a practical technique for faster detection of objects at various depths using template matching.

DETAILED DESCRIPTION

Example Use

Figure 1:
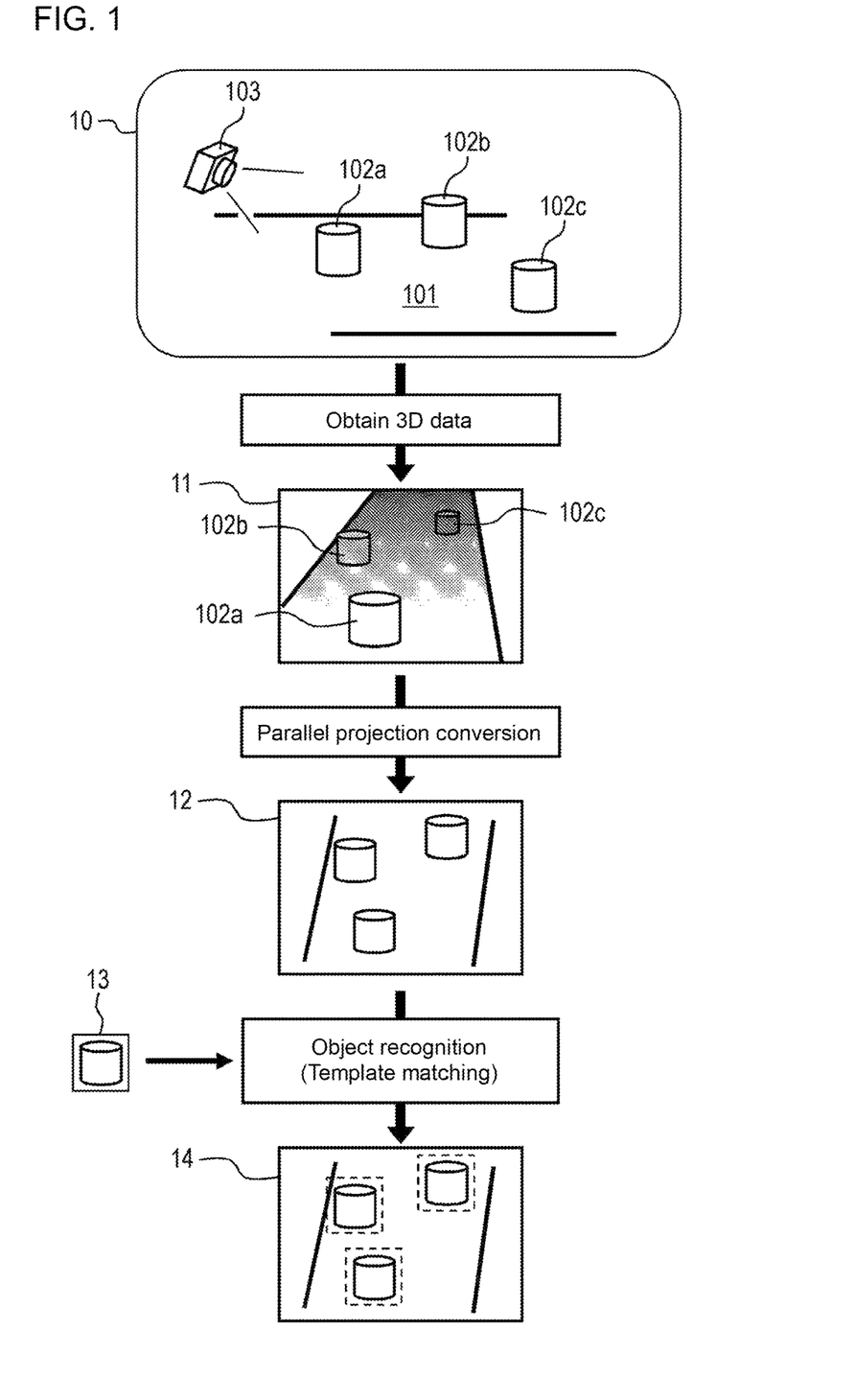
FIG. 1 is a schematic diagram showing the processes performed by an object recognition apparatus.

FIG. 1 schematically shows the processes performed by an object recognition apparatus as an example implementation of the present invention. FIG. 1 shows a scene 10 in which three objects 102a, 102b, and 102c on a stage 101 are measured (imaged) from diagonally above with a camera 103. The objects 102a, 102b, and 102c have the same shape (cylinder) and the same size, but are located in order of depth from the camera 103.

Example 3D data 11 is generated based on an image captured with the camera 103. The 3D data 11 includes multiple points each having 3D information. The 3D data 11 may be in any format. For example, the 3D data 11 may represent points each having 3D coordinates. The 3D data 11 may represent a 2D image having points (pixels) each associated with a depth value (information about depth). The 3D coordinates may be in a camera coordinate system, a global coordinate system, or any other coordinate system. The 3D data 11 in FIG. 1 shows an example depth image having the depth values expressed by light and shade for convenience (points farther from the camera 103 are darker). A typical object system forms smaller images for objects farther from the camera 103. The objects 102a, 102b, and 102c thus have image sizes in descending order.

Known template matching uses multiple templates of different sizes or, as described in Patent Literature 1, scales a template in accordance with the depth value to accommodate objects of various sizes. However, such known techniques may have lower processing speed or larger memory capacity as described above.

In the embodiment of the present invention, the 3D data 11 undergoes parallel projection conversion to generate a 2D image 12 for template matching. For objects with the same actual size, 2D images 12 resulting from parallel projection conversion have the same size. Thus, a template 13 for a single size alone allows detection of all the objects 102a, 102b, and 102c included in the 2D image 12. An example recognition result 14 is shown.

The method according to the present embodiment allows faster processing than known methods. This method also uses fewer templates, less data, and less work memory, and is thus practical. In the example shown in FIG. 1, the objects 102a, 102b, and 102c are in the same orientation for convenience. An object may have the shape that appears different depending on the orientation (or in other words, the angle from which the object is viewed). In this case, the template 13 may be prepared for each orientation to be recognized.

Embodiments (Overall Structure of Object Recognition Apparatus)

Figure 2:
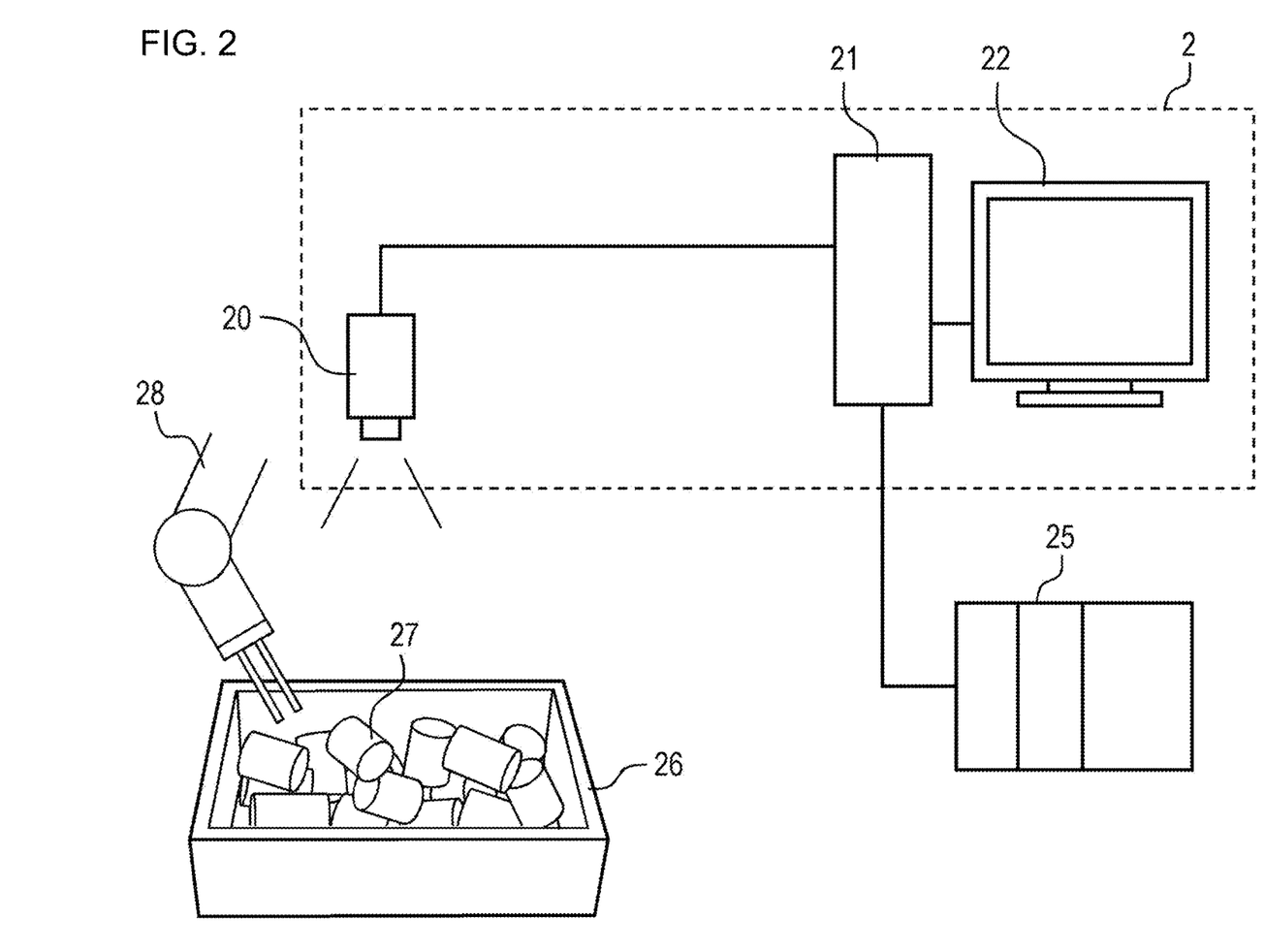
FIG. 2 is a schematic diagram of the object recognition apparatus showing its overall structure.

The object recognition apparatus according to the embodiment of the present invention will now be described with reference to FIG. 2.

An object recognition apparatus 2 is a system installed on a production line for assembling or machining articles. The object recognition apparatus 2 uses data received from a sensor unit 20 to recognize the positions and orientations of objects 27 placed on a tray 26 using template matching (3D object recognition). The objects 27 to be recognized (hereafter also target objects) are randomly placed on the tray 26.

The object recognition apparatus 2 mainly includes the sensor unit 20 and an image processor 21. The sensor unit 20 is connected to the image processor 21 with wires or wirelessly. The output from the sensor unit 20 is received by the image processor 21. The image processor 21 uses data received from the sensor unit 20 to perform various processes. The processes performed by the image processor 21 may include distance measurement (ranging), 3D shape recognition, object recognition, and scene recognition. The object recognition apparatus 2 outputs the recognition result to, for example, a programmable logic controller (PLC) 25 or a display 22. The recognition result is used in, for example, controlling a picking robot 28, a machining device, and a printer, or inspecting or measuring the target objects 27.

(Sensor Unit)

The sensor unit 20 includes at least a camera for capturing optical images of the target objects 27. The sensor unit 20 may include any component (e.g., a sensor, an illuminator, or a projector) to be used for 3D measurement of the target objects 27. For measuring the depth using stereo matching (also referred to as stereo vision or a stereo camera system), for example, the sensor unit 20 includes multiple cameras. For active stereo, the sensor unit 20 further includes a projector for projecting patterned light onto the target objects 27. For 3D measurement using pattern projection with space encoding, the sensor unit 20 includes a projector for projecting patterned light and cameras. Any other method may be used to generate 3D information about the target objects 27, such as photometric stereo, a time-of-flight (TOF) method, or phase shifting.

(Image Processor)

The image processor 21 is, for example, a computer including a central processing unit (CPU), a random-access memory (RAM), a nonvolatile storage (e.g., a hard disk drive, or a solid-state drive or SSD), an input device, and an output device. In this case, the CPU loads the program stored in the nonvolatile storage into the RAM and executes the program to implement various components described later. The image processor 21 may have any other configuration. The components may be entirely or partly implemented by a dedicated circuit such as a field-programmable gate array (FPGA) or an application-specific integrated circuit (ASIC), or by cloud computing or distributed computing.

Figure 3:
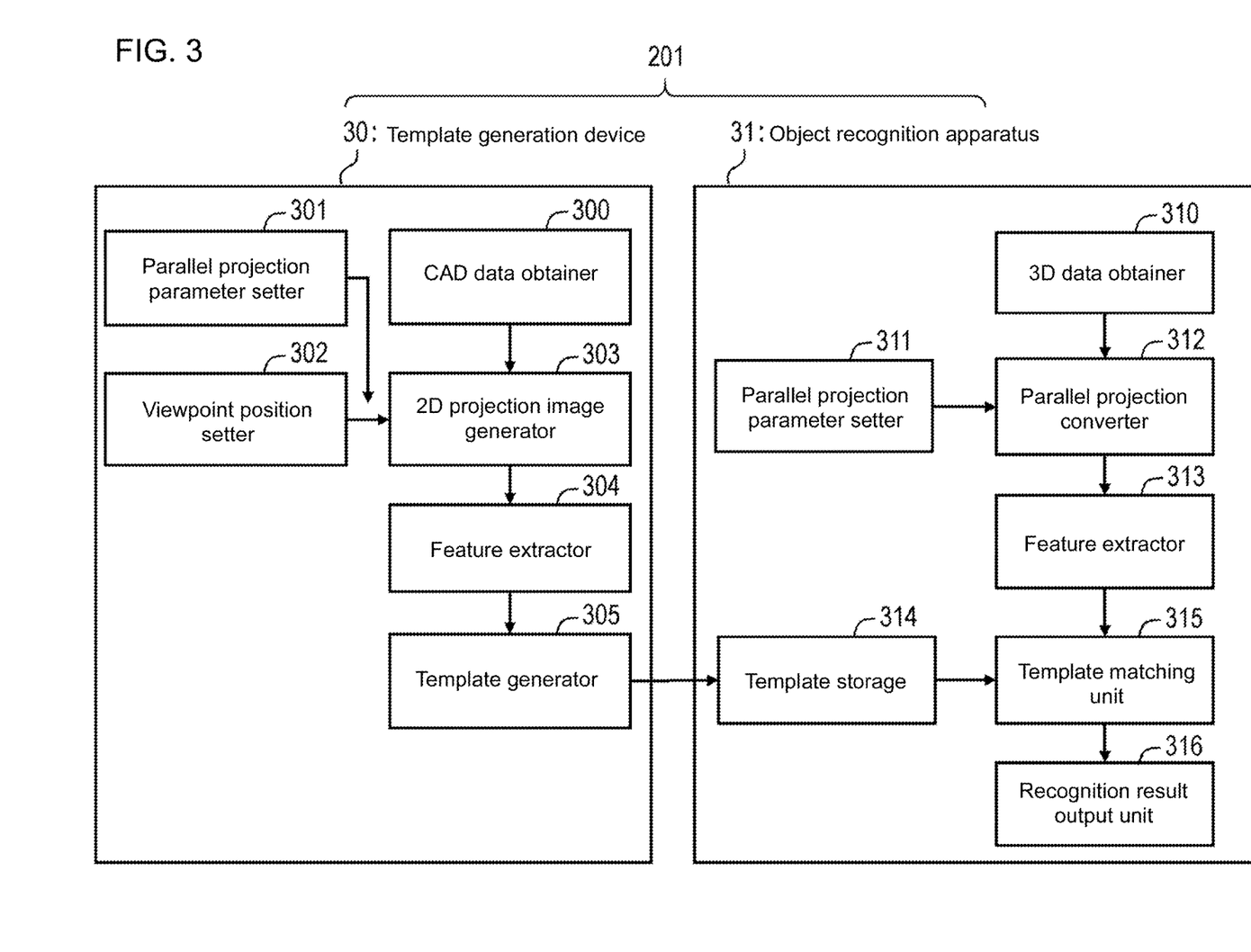
FIG. 3 is a block diagram of an image processor.

FIG. 3 is a block diagram of the image processor 21. The image processor 21 includes a template generation device 30 and an object recognition processing device 31. The template generation device 30 generates templates to be used for the object recognition process and includes a 3D computer-aided design (CAD) data obtainer 300, a parallel projection parameter setter 301, a viewpoint position setter 302, a 2D projection image generator 303, a feature extractor 304, and a template generator 305. The object recognition processing device 31 performs the object recognition process using template matching and includes a 3D data obtainer 310, a parallel projection parameter setter 311, a parallel projection converter 312, a feature extractor 313, a template storage 314, a template matching unit 315, and a recognition result output unit 316. The feature extractor 313, the template storage 314, and the template matching unit 315 in the present embodiment form a recognition processor in one or more aspects of the present invention.

(Template Generation Process)

Figure 4:
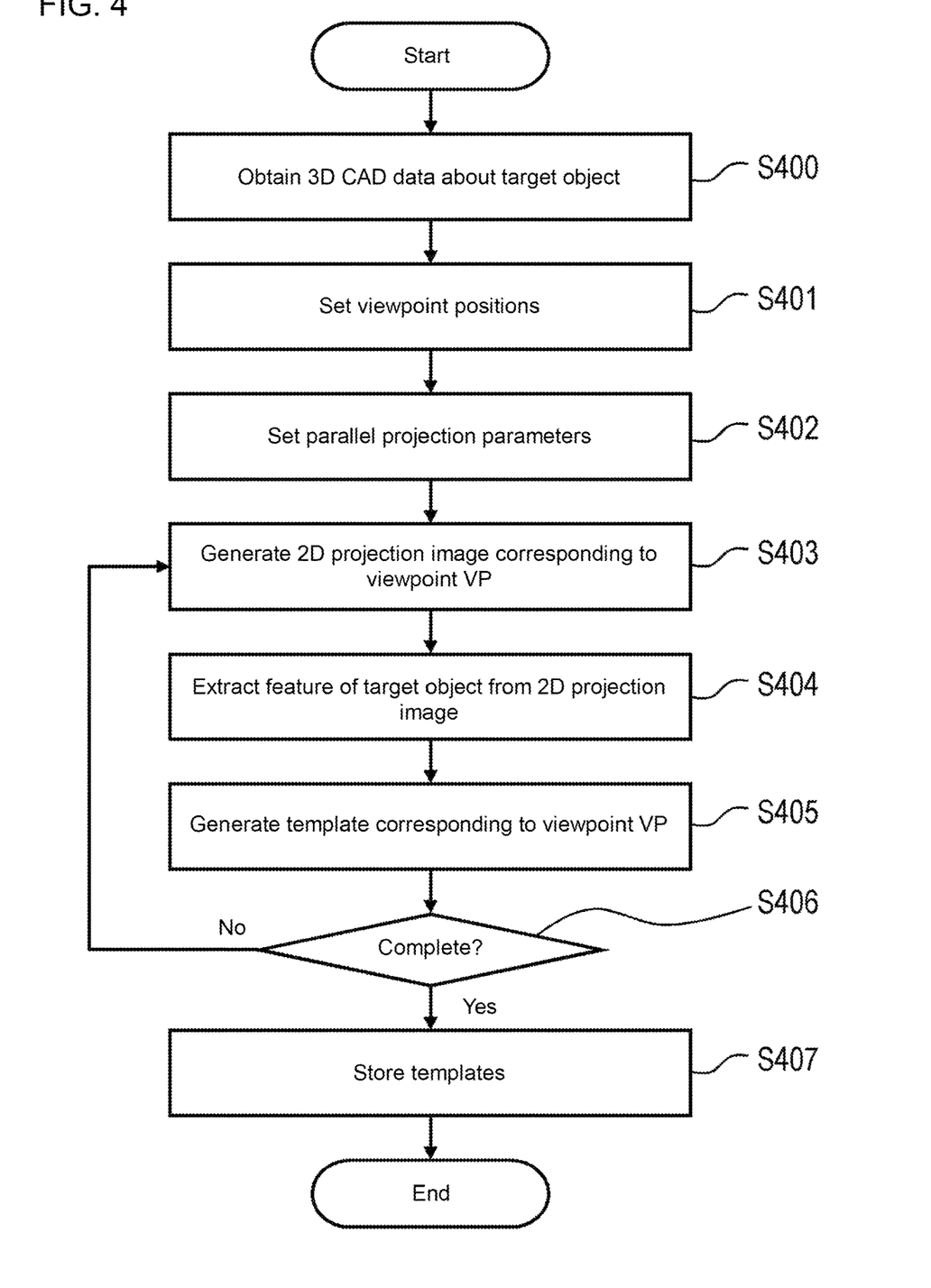
FIG. 4 is a flowchart of a template generation process.

An example template generation process performed by the template generation device 30 will now be described with reference to the flowchart in FIG. 4.

In step S400, the 3D CAD data obtainer 300 obtains 3D CAD data about a target object 27. The CAD data may be read from an internal storage in the image processor 21, or may be obtained from an external CAD system or an external storage through a network. Three-dimensional shape data measured with, for example, a 3D sensor may be obtained instead of CAD data.

In step S401, the viewpoint position setter 302 sets viewpoint positions for which templates are to be generated.

Figure 5:
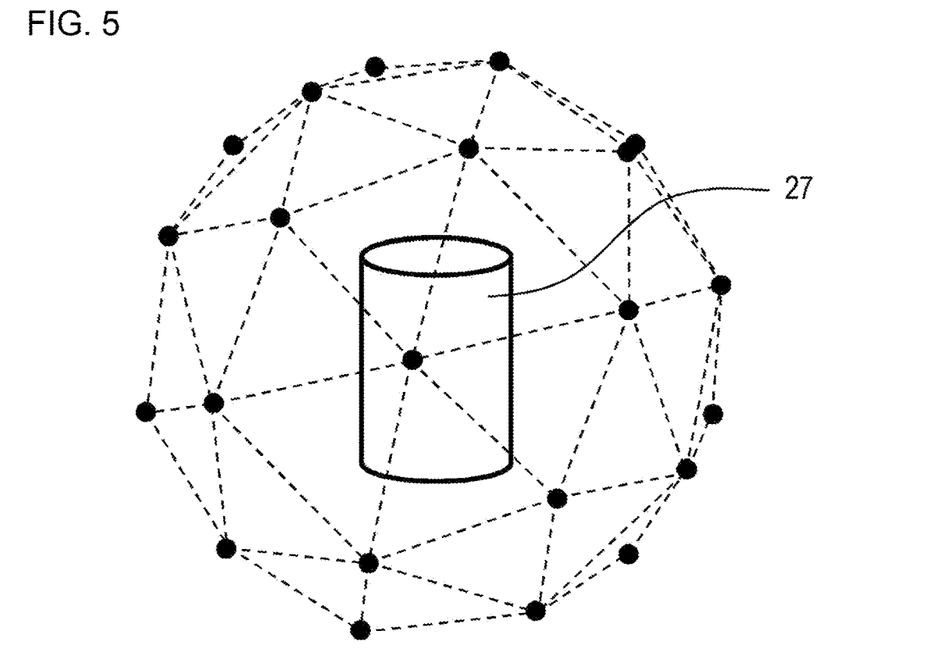
FIG. 5 is a diagram describing an example of set viewpoint positions.

FIG. 5 shows an example of set viewpoint positions. In this example, the viewpoints (indicated by the black dots) are set to 42 vertices of an octacontahedron surrounding the target object 27. The number or the arrangement of viewpoints may be set as appropriate for the resolution to be expected or the shape or possible orientations of the target object 27. The number or the arrangement of viewpoints may be specified by the user or automatically set by the viewpoint position setter 302.

In step S402, the parallel projection parameter setter 301 sets parallel projection parameters to be used for template generation. In this example, two parallel projection parameters $res_x$ and $res_y$ are used. The parameters ($res_x$, $res_y$) indicate the dimension (in units of mm) of one pixel of the projection image. Parallel projection parameters are used also for parallel projection conversion in the object recognition process (described later). The parameters used for the object recognition process may have the same values as those for template generation. Using the same parallel projection parameter values allows the target object 27 in the template to have the same size as the target object 27 in the parallel projection image generated in the object recognition process. This eliminates scaling of the template or the image for template matching.

Figure 6:
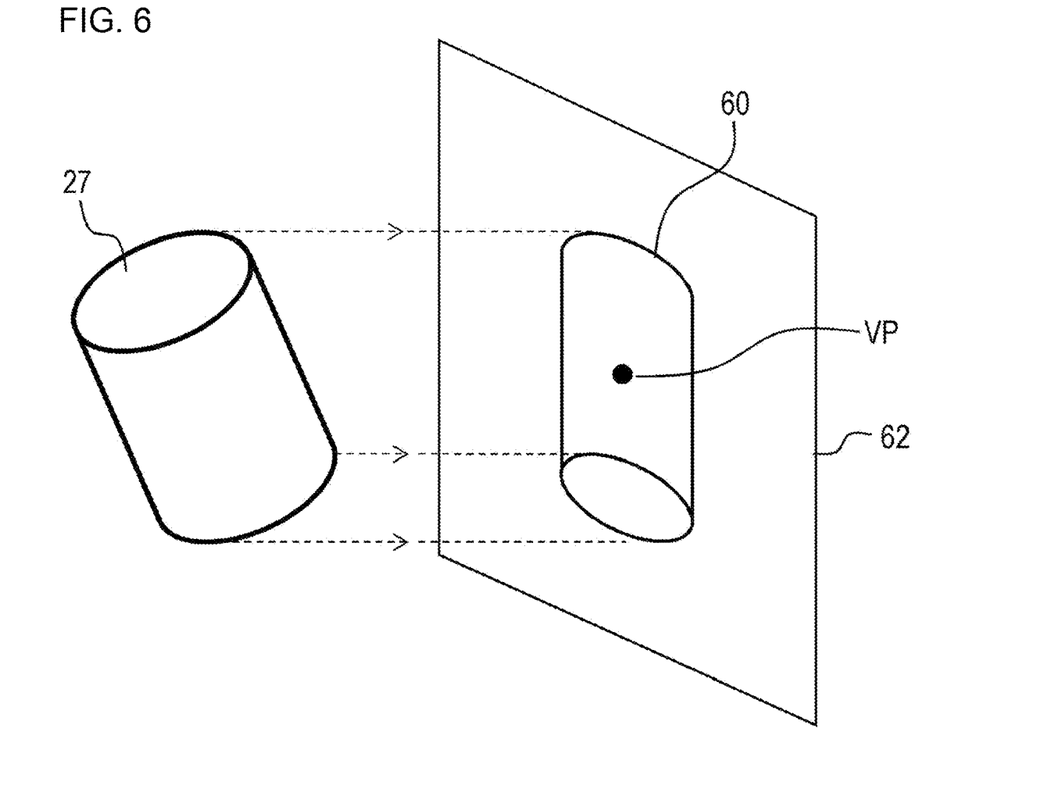
FIG. 6 is a diagram describing an example parallel projection image in the template generation process.

In step S403, the 2D projection image generator 303 generates a 2D projection image by parallel projection of the 3D CAD data. FIG. 6 shows an example 2D projection image. The points on the surface of the target object 27 undergo parallel projection onto a projection plane 62 passing through a viewpoint VP to generate a 2D projection image 60 corresponding to the viewpoint VP.

In step S404, the feature extractor 304 extracts the image feature of the target object 27 from the 2D projection image 60 generated in step S403. Examples of the image feature include a luminance, a color, a luminance gradient orientation, a quantized gradient orientation, a histogram of oriented gradients (HOG), the direction of a normal to the surface, a HAAR-like feature, and a feature obtained with scale-invariant feature transform (SIFT). The luminance gradient orientation is a continuous-value representation of gradient orientations (angles) of luminance in a local area around a feature point. The quantized gradient orientation is a discrete-value representation of gradient orientations of luminance in a local area around a feature point (for example, eight directions are represented by 1-byte information corresponding to 0 to 7). The feature extractor 304 may obtain the image feature for all the points (pixels) in the 2D projection image 60 or for points sampled in accordance with a predetermined rule. The points at which the image feature has been obtained are referred to as feature points.

In step S405, the template generator 305 generates a template corresponding to the viewpoint VP based on the image feature extracted in step S404. The template is, for example, a dataset including the coordinates of the feature points and the extracted image feature.

Steps S403 to S405 are performed for all the viewpoints set in step S401 (step S406). Upon completing generation of the templates for all the viewpoints, the template generator 305 stores the template data into the template storage 314 in the object recognition processing device 31 (step S407). The template generation process is thus complete.

(Object Recognition Process)

An example object recognition process performed by the object recognition processing device 31 will now be described with reference to the flowchart in FIG. 7.

In step S700, the 3D data obtainer 310 generates 3D data in the field of view based on images captured with the sensor unit 20. In the present embodiment, 3D information about the points in the field of view is obtained using an active stereo system. In this system, two cameras are used to capture stereo images with patterned light projected from a projector, and the depth is calculated based on the parallax between the images.

In step S701, the parallel projection parameter setter 311 sets parallel projection parameters to be used for parallel projection conversion. In this example, four parallel projection parameters $res_x$, $res_y$, $c_x$, and $c_y$ are used. The parameters ($res_x$, $res_y$) indicate the dimension (in units of mm) of one pixel of the projection image and may be set as intended. For example, they may be determined as $res_x=d/f_x$ and $res_y=d/f_y$, using focal lengths ($f_x$, $f_y$) of the cameras in the sensor unit 20, where d is the constant set in accordance with the depth at which the target object 27 can be located. For example, the constant d may be set to the average, minimum, or maximum value of the depth from the sensor unit 20 to the target object 27. The parameters ($res_x$, $res_y$) may have the same values as those used for template generation as described above. The parameters ($c_x$, $c_y$) are the coordinates of the center of the projection image.

In step S702, the parallel projection converter 312 generates a 2D projection image by parallel projection of the points (hereafter, 3D points) in 3D data onto a predetermined projection plane.

Figure 8:
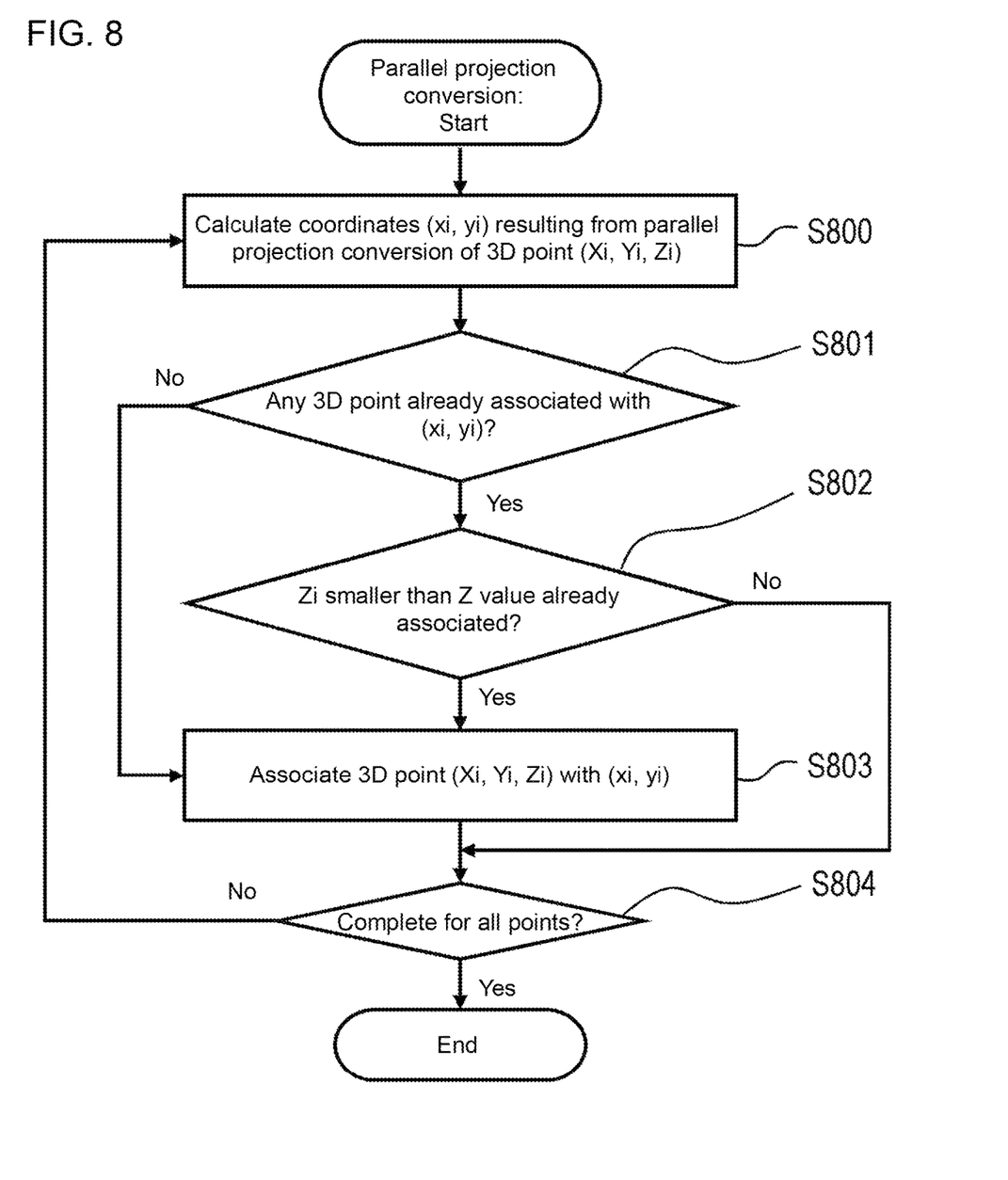
FIG. 8 is a flowchart of parallel projection conversion in the object recognition process.
Figure 9:
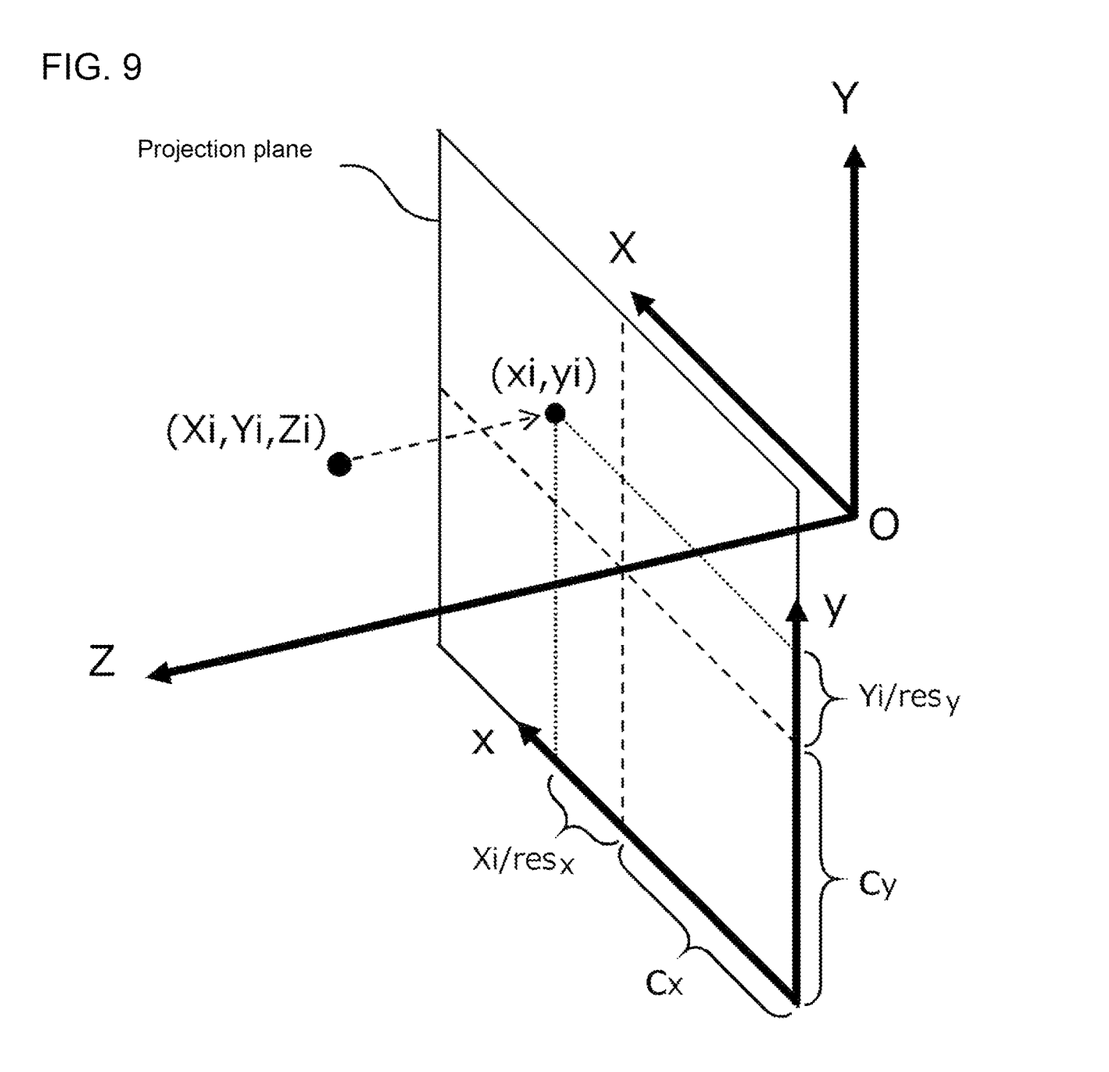
FIG. 9 is a diagram describing an example of a set camera coordinate system and a set projection image coordinate system.

The parallel projection conversion will now be described in detail with reference to FIGS. 8 and 9. In step S800, the parallel projection converter 312 calculates image coordinates resulting from parallel projection of a 3D point. Each point in the camera coordinate system is indicated by (X, Y, Z). Each point in the image coordinate system for the projection image is indicated by (x, y). In the example shown in FIG. 9, the camera coordinate system is set to have origin O being the center (cardinal points) of a camera lens in the sensor unit 20, Z-axis aligning with the optical axis, and X- and Y-axes respectively parallel to the horizontal and vertical directions of the image sensor in the camera. The image coordinate system is set to have the image center ($c_x$, $c_y$) being located on Z-axis of the camera coordinate system and have x- and y-axes respectively parallel to X- and Y-axes of the camera coordinate system. The image coordinate system has the x-y plane defining the projection plane. In other words, the projection plane for parallel projection conversion is set to be orthogonal to the optical axis of the camera in the present embodiment. In the coordinate system set as shown in FIG. 9, the image coordinates ($x_i$, $y_i$) resulting from parallel projection conversion of the 3D point ($X_i$, $Y_i$, $Z_i$) are determined by $x_i=ROUND(X_i/res_x+c_x)$ and $y_i=ROUND(Y_i/res_y+c_y)$, where ROUND is an operator for rounding values to integers.

In step S801, the parallel projection converter 312 checks whether any 3D point has already been projected onto the image coordinates ($x_i$, $y_i$). More specifically, the parallel projection converter 312 determines whether the pixel ($x_i$, $y_i$) in the projection image is already associated with information about any 3D point. In response to no 3D point being already associated (No in step S801), the parallel projection converter 312 associates information about the 3D point ($X_i$, $Y_i$, $Z_i$) with the pixel ($x_i$, $y_i$) (step S803). Information associated with the pixel ($x_i$, $y_i$) is not limited to the coordinates ($X_i$, $Y_i$, $Z_i$) of the 3D point as in the present embodiment, but may be the depth (e.g., $Z_i$ value), the color (e.g., RGB value), or the luminance of the 3D point. In response to a 3D point being already associated (Yes in step S801), the parallel projection converter 312 compares the $Z_i$ value with the Z value already associated. In response to $Z_i$ being smaller (Yes in step S802), the information associated with the pixel ($x_i$, $y_i$) is updated with the information about the 3D point ($X_i$, $Y_i$, $Z_i$) (step S803). In response to multiple 3D points being projected onto the same position on the projection plane, information about the 3D point closest to the camera is thus used to generate a projection image. Upon completion of steps S800 to S803 for all the 3D points, the process advances to step S703 in FIG. 7 (step S804).

In step S703, the feature extractor 313 extracts the image feature from the projection image. The image feature extracted in this step is the image feature used for template generation. In step S704, the template matching unit 315 reads templates from the template storage 314 and detects a target object in the projection image by template matching using the templates. Templates with different viewpoints may be used to recognize the orientation of the target object. In step S705, the recognition result output unit 316 outputs the recognition result. The object recognition process is thus complete.

Advantages of Present Embodiment

With the structures and processes described above, 3D data undergoes parallel projection to generate a 2D image for template matching. In parallel projection, target objects at any distance from the projection plane are projected to have the same size. All the 2D images of target objects (at any depth) generated by parallel projection have the same size. Thus, a template for a single size alone may be used for matching, allowing faster processing than known methods. This method also uses fewer templates, less data, and less work memory, and is thus practical.

In the present embodiment, the template is also generated from the parallel projection image. This allows more accurate matching between the template and the target object image in an image resulting from parallel projection conversion. This allows a more reliable object recognition process.

In the present embodiment, the projection plane is set to be orthogonal to the optical axis of the camera. This simplifies calculation for converting the camera coordinate system into the image coordinate system, allowing a faster parallel projection conversion process and thus a faster object recognition process using template matching. The projection plane set to be orthogonal to the optical axis of the camera also reduces distortion of the target object image resulting from parallel projection conversion.

In response to multiple 3D points being projected onto the same pixel, information about the 3D point closest to the camera alone is used. This allows generation of a parallel projection image reflecting any overlap between objects (one object hidden behind another) as viewed from the camera, thus allowing an accurate object recognition process using template matching.

<Others>

The embodiments described above are mere examples of the present invention. The present invention is not limited to the embodiments described above, but may be modified variously within the scope of the technical ideas of the invention.

Figure 7:
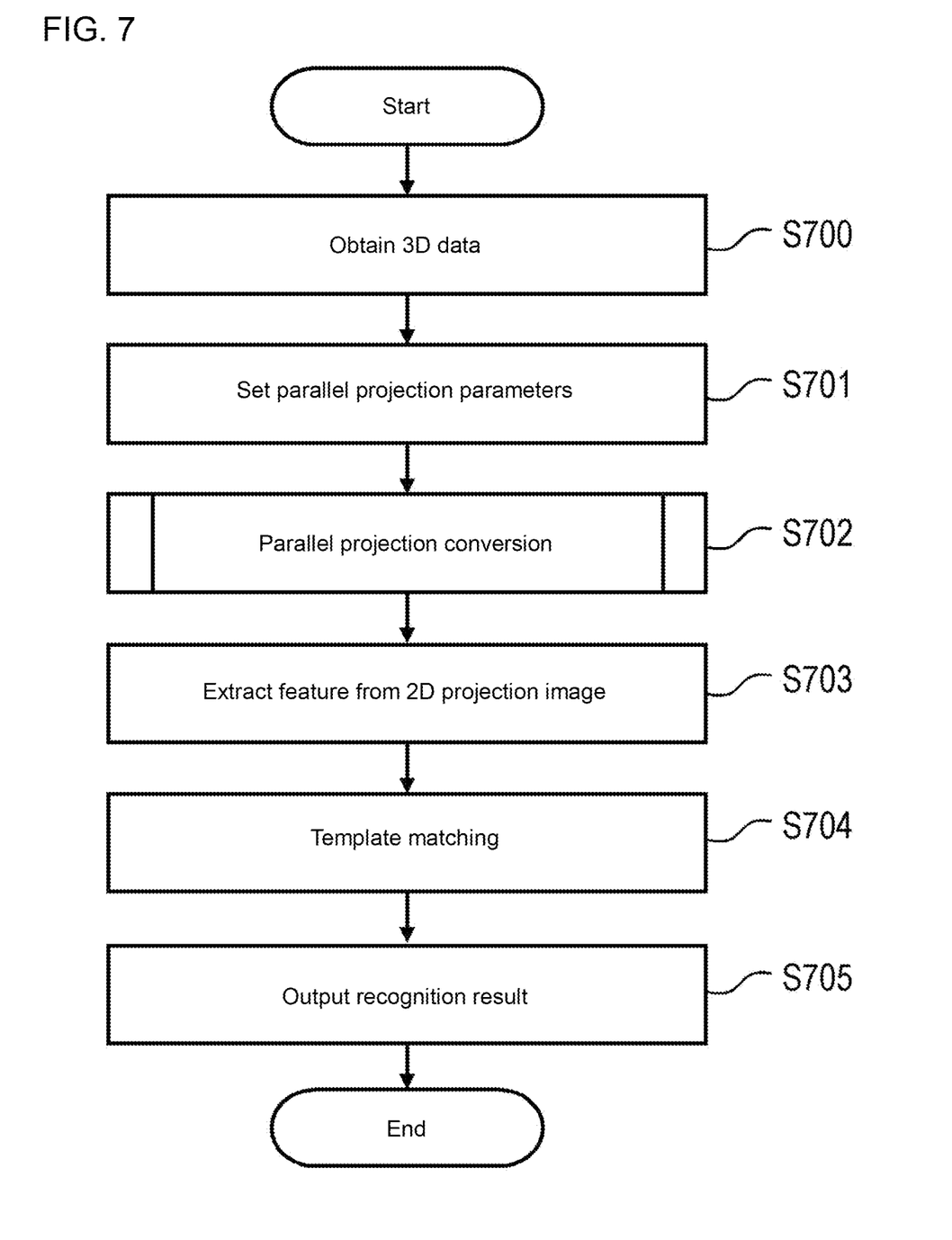
FIG. 7 is a flowchart of an object recognition process.
Figure 10:
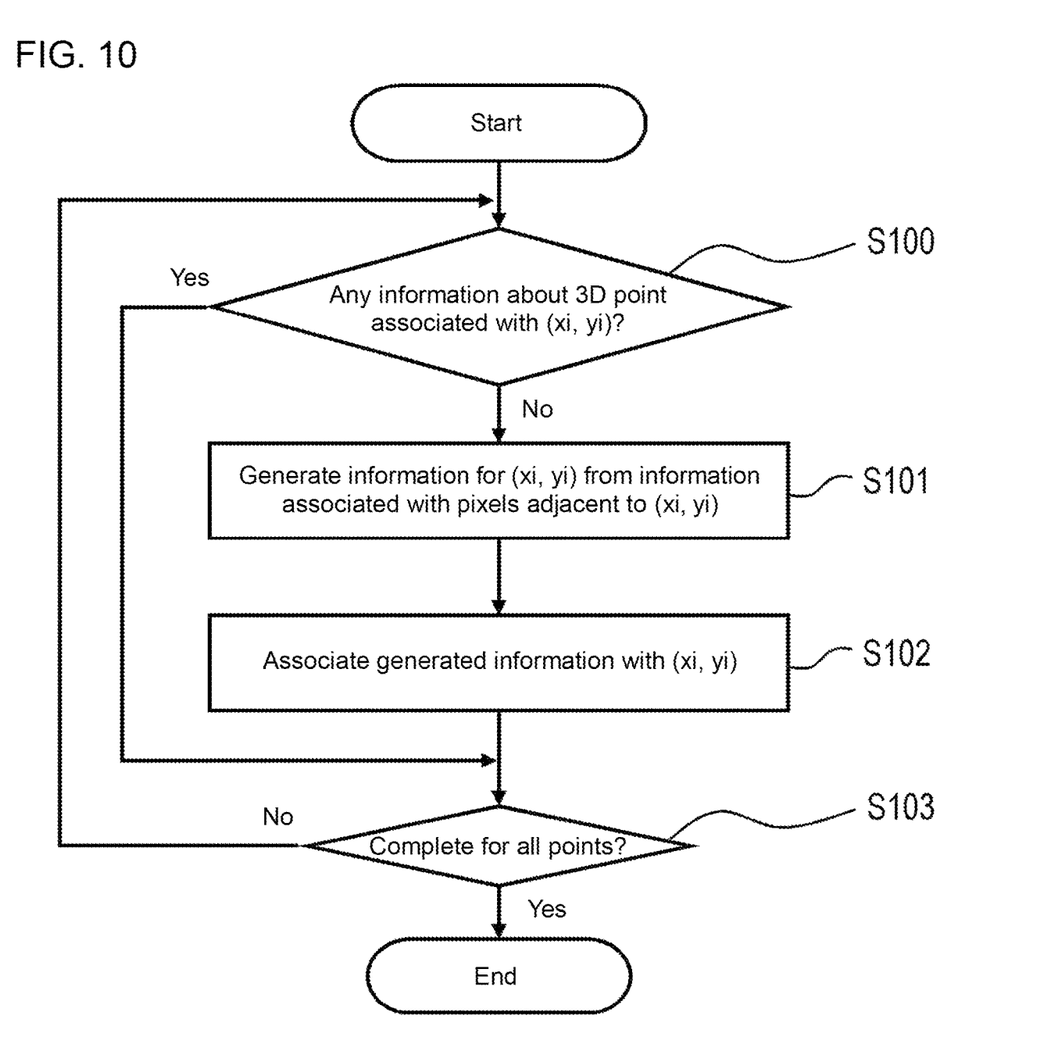
FIG. 10 is a flowchart of a projected-point supplementation process.

For example, a projected-point supplementation process shown in FIG. 10 may be performed after the parallel projection conversion process (step S702 in FIG. 7). More specifically, the parallel projection converter 312 checks whether any information about a 3D point is associated with a pixel ($x_i$, $y_i$) in the projection image generated in step S702 (step S100). In response to no information about a 3D point being associated (or in other words, no projected point), the parallel projection converter 312 generates information for the pixel ($x_i$, $y_i$) based on information associated with pixels (e.g., four or eight adjoining pixels) adjacent to the pixel ($x_i$, $y_i$) (step S101). The information for the pixel ($x_i$, $y_i$) may be generated using interpolation, such as nearest-neighbor interpolation, bilinear interpolation, or bicubic interpolation. The parallel projection converter 312 then associates the information generated in step S101 with the pixel ($x_i$, $y_i$) (step S102). Steps S100 to S102 are performed for all the pixels in the projection image. This process increases the amount of information about the projection image (the number of projected points) and may thus allow more accurate template matching.

The projection plane may be set in a manner different from the example shown in FIG. 9. For example, the projection plane may be located rearward (nearer the image) from origin O of the camera coordinate system. In some embodiments, the projection plane may be located to diagonally intersect the optical axis (Z-axis), or in other words, to cause the projection direction to be nonparallel to the optical axis.

Appendix (1) An object recognition apparatus (2), comprising:
a three-dimensional data obtainer (310) configured to obtain three-dimensional data including a plurality of points each having three-dimensional information;
a parallel projection converter (312) configured to generate a two-dimensional image by parallel projection of the plurality of points included in the three-dimensional data onto a projection plane; and
a recognition processor (313, 314, 315) configured to detect a target object in the two-dimensional image using template matching.

REFERENCE SIGNS LIST 2 object recognition apparatus
20 sensor unit
21 image processor
22 display
27 target object
30 template generation device
31 object recognition processing device

The invention claimed is:
1. An object recognition apparatus, comprising:
a three-dimensional data obtainer configured to obtain three-dimensional data including a plurality of points each having three-dimensional information;
a parallel projection converter configured to generate a two-dimensional image by parallel projection of the plurality of points included in the three-dimensional data onto a projection plane; and
a recognition processor configured to detect a target object in the two-dimensional image using template matching, wherein
in response to a first point included in the three-dimensional data being projected onto a first pixel in the two-dimensional image, i) depth information determined from the three-dimensional information about the first point, ii) luminance information that the first point has, or iii) color information that the first point has is associated with the first pixel by the parallel projection converter.

2. The object recognition apparatus according to claim 1, wherein
the recognition processor uses, as a template for the target object, a template generated from an image resulting from parallel projection of the target object.

3. The object recognition apparatus according to claim 1, wherein
the three-dimensional data is generated using an image captured with a camera, and
the parallel projection converter sets the projection plane to be orthogonal to an optical axis of the camera.

4. The object recognition apparatus according to claim 1, wherein
in response to no point being projected onto a second pixel in the two-dimensional image, the parallel projection converter generates, based on information associated with a pixel adjacent to the second pixel, information to be associated with the second pixel.

5. The object recognition apparatus according to claim 4, wherein
the parallel projection converter determines the information to be associated with the second pixel by interpolating information associated with the pixel adjacent to the second pixel.

6. An object recognition apparatus, comprising:
a three-dimensional data obtainer configured to obtain three-dimensional data including a plurality of points each having three-dimensional information;
a parallel projection converter configured to generate a two-dimensional image by parallel projection of the plurality of points included in the three-dimensional data onto a projection plane; and
a recognition processor configured to detect a target object in the two-dimensional image using template matching, wherein
the three-dimensional data is generated using an image captured with a camera, and
in response to two or more points of the plurality of points included in the three-dimensional data being projected onto the same position on the projection plane, the parallel projection converter uses one of the two or more points closest to the camera to generate the two-dimensional image.

7. An object recognition method, comprising:
obtaining three-dimensional data including a plurality of points each having three-dimensional information;
generating a two-dimensional image by parallel projection of the plurality of points included in the three-dimensional data onto a projection plane; and
detecting a target object in the two-dimensional image using template matching, wherein
in response to a first point included in the three-dimensional data being projected onto a first pixel in the two-dimensional image, i) depth information determined from the three-dimensional information about the first point, ii) luminance information that the first point has, or iii) color information that the first point has is associated with the first pixel in generating the two-dimensional image.

8. A non-transitory computer readable medium storing a program for causing a computer to perform operations included in the object recognition method according to claim 7.

9. An object recognition method, comprising:
obtaining three-dimensional data including a plurality of points each having three-dimensional information;

generating a two-dimensional image by parallel projection of the plurality of points included in the three-dimensional data onto a projection plane; and detecting a target object in the two-dimensional image using template matching, wherein the three-dimensional data is generated using an image captured with a camera, and in response to two or more points of the plurality of points included in the three-dimensional data being projected onto the same position on the projection plane, one of the two or more points closest to the camera is used in generating the two-dimensional image.

10. A non-transitory computer readable medium storing a program for causing a computer to perform operations included in the object recognition method according to claim 9.

* * * * *